(12) United States Patent
Kishigami

(10) Patent No.: US 7,185,021 B2
(45) Date of Patent: Feb. 27, 2007

(54) NAVIGATION DEVICE FOR DISPLAYING DATED MAP DATA

(75) Inventor: Keiju Kishigami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 310 days.

(21) Appl. No.: 09/991,737

(22) Filed: Nov. 26, 2001

(65) Prior Publication Data

US 2002/0173859 A1    Nov. 21, 2002

(30) Foreign Application Priority Data

May 18, 2001    (JP)    ............................. 2001-149836

(51) Int. Cl.
*G06F 17/00*    (2006.01)
*G06K 9/00*    (2006.01)
*G06C 21/30*    (2006.01)

(52) U.S. Cl. .................. 707/104.1; 707/101; 707/102; 707/103 Y; 382/113; 715/853; 715/855; 701/208; 701/209

(58) Field of Classification Search ................ 701/200, 701/208, 209; 707/101, 102, 103 Y, 104.1; 715/855, 853; 382/113
See application file for complete search history.

(56) References Cited

U.S. PATENT DOCUMENTS 3,731,387 A * 5/1973 Slemmons .................... 33/430
4,661,811 A * 4/1987 Gray et al. .................. 345/636
5,325,482 A * 6/1994 Bormans ..................... 345/630
5,519,609 A * 5/1996 Kuchenrither et al. ......... 702/5
5,552,989 A * 9/1996 Bertrand ..................... 701/200
5,581,259 A * 12/1996 Schipper .................... 342/451
5,761,649 A * 6/1998 Hill ............................. 705/27
5,920,261 A * 7/1999 Hughes et al. ........... 340/568.8
5,986,604 A * 11/1999 Nichols et al. ......... 342/357.12
6,107,961 A * 8/2000 Takagi .................... 342/357.13
6,453,233 B1 * 9/2002 Kato .......................... 701/208
6,470,267 B1 * 10/2002 Nozaki ....................... 701/209
6,823,249 B2 * 11/2004 Moore et al. ................. 701/50
6,861,229 B2 * 3/2005 Carrion et al. ............... 435/7.1

FOREIGN PATENT DOCUMENTS

JP    A2000-111351    4/2000
JP    A2000-242164    9/2000

* cited by examiner

Primary Examiner—Thuy N. Pardo
(74) Attorney, Agent, or Firm—Birch, Stewart, Kolasch & Birch, LLP

(57) ABSTRACT

There is disclosed a navigation device designed to display emphasis display data edited by an emphasis display data editing part and normal display data edited by a normal display data editing part in a superposing manner. Thus, a clear visible map can be displayed.

11 Claims, 5 Drawing Sheets

51  52

NAVIGATION DEVICE FOR DISPLAYING DATED MAP DATA

BACKGROUND OF THE INVENTION

1. Field of the Invention

The present invention relates to a navigation device capable of displaying maps of a plurality of calendar years.

2. Description of the Related Art

For example, a navigation device disclosed in Japanese Patent Application Laid-Open No. 2000-111351 displays a map by combining a past map data with a latest map data.

In other words, displaying is carried out by superposing a past map on a latest map. Thus, as shown in FIG. 8, it has been difficult to determine whether facility such as a road, a building or the like displayed on the map is of the present time or once existed in the past.

Because of the above constitution, there has been a difficulty inherent in the conventional navigation device, of determining whether facility such as a road, a building or the like displayed on the map is of the present time or once existed in the past.

SUMMARY OF THE INVENTION

The present invention was made to solve the foregoing problem, and it is an object of the invention to provide a navigation device capable of displaying a clear visible map.

In accordance with the invention, there is provided a navigation device, comprising: map storing means for storing map data of plurality of year map data; specifying means for specifying a year to be displayed; emphasis display editing means for reading map data of a year specified by said specifying means from said map storing means, and editing the map data to be displayed in the emphasis display mode as emphasis display data; normal display editing means for reading map data other than that of the year specified by the specifying means from said map storing means, and editing the map data to be displayed in the normal display mode as normal display data; and displaying means for displaying the emphasis display data edited by the emphasis display editing means and the normal display data edited by said normal display editing means in a superposing manner.

According to the navigation device of the invention, when among data items included in the map data, a data item to be displayed with emphasis is specified by the specifying means, which emphasis display editing means edits only the specified data item to be emphasis display data, and other data items to be normal display data.

In accordance with the invention, there is provided a navigation device, comprising: map storing means for storing map data of a plurality of years; specifying means for specifying a year to be displayed; normal display editing means for reading map data of the year specified by said specifying means from said map storing means, and editing the map data to be displayed in the normal display mode as normal display data; weak display editing means for reading map data other than that of the year specified by the specifying means from the map storing means, and editing the map data to be displayed in the weak display mode as weak display data; and displaying means for displaying the normal display data edited by the normal display editing means and the weak display data edited by the weak display editing means in a superposing manner.

According to the navigation device of the invention, when among data items included in the map data, a data item to be displayed in the normal display mode is specified by the specifying means, said normal display editing means edits only the specified data item to be normal display data, and other data items to be weak display data.

In accordance with the invention, there is provided a navigation device, comprising: map storing means for storing map data of a plurality of years; specifying means for specifying a year to be displayed; editing means for reading map data of the year specified by the specifying means from the map storing means, and editing the map data to be display data; and displaying means for displaying the display data edited by the editing means.

In accordance with the invention, there is provided a navigation device, comprising: map storing means for storing map data of a plurality of years; specifying means for specifying a year to be displayed; first editing means for reading map data of the year specified by the specifying means from the map storing means, and editing the map data to be display data; second editing means for reading map data other than that of the year specified by said specifying means from the map storing means, and editing the map data to be display data; and displaying means for displaying the display data edited by the first editing means in a first display area, and the display data edited by the second editing means in a second display area.

According to the invention, the navigation device further comprises: searching means for searching, when a year and a data item are specified by said specifying means, an updated portion of the map data based on the specified year and data item.

According to the navigation device of the invention, the data item specified by said specifying means is one selected from road information, facility information, address information and telephone number information.

According to the navigation device of the invention, as the map data other than that of the year specified by the specifying means, latest map data is read out.

DETAILED DESCRIPTION OF THE PREFERRED EMBODIMENTS

Next, the preferred embodiments of the present invention will be described as shown below.

First Embodiment

Figure 1:
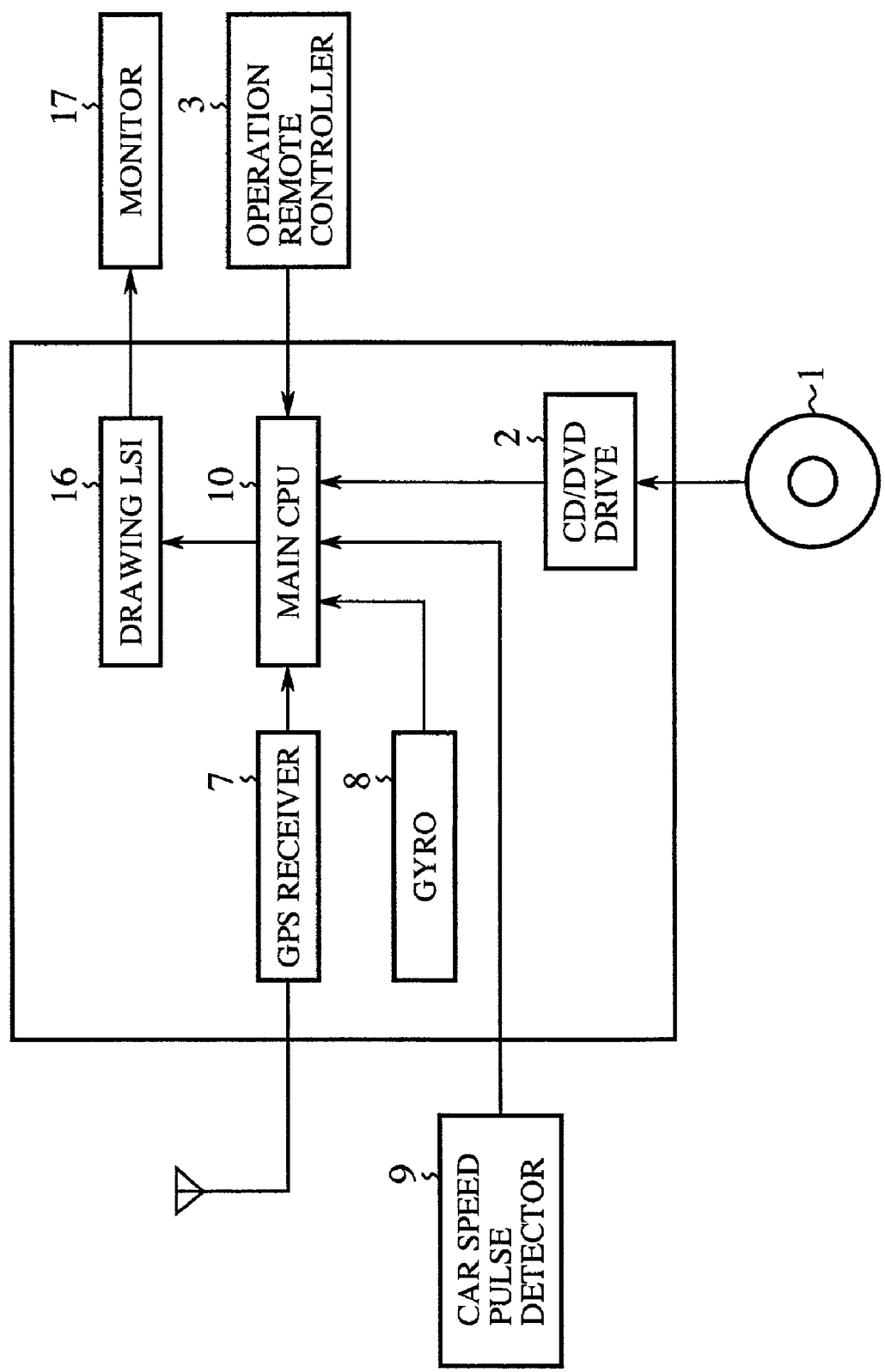
FIG. 1 is a schematic diagram showing a navigation device according to a first embodiment of the present invention.
Figure 2:
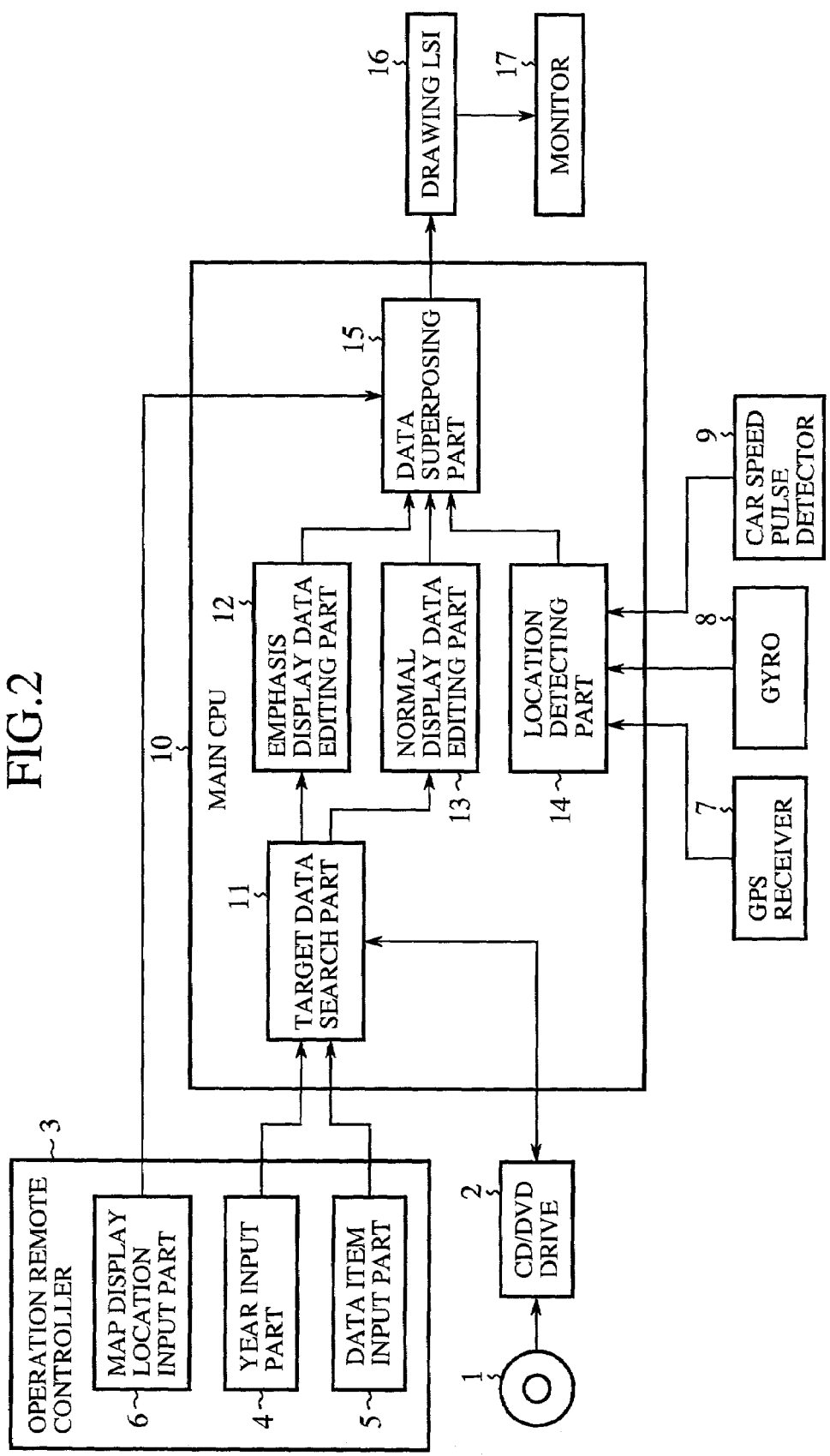
FIG. 2 is a schematic diagram showing the detailed construction of the navigation device of the first embodiment of the invention.

FIG. 1 is a schematic diagram showing a navigation device according to the first embodiment of the invention; and FIG. 2 shows a detailed constitution of the same. In the drawings, a reference numeral 1 denotes a disk (map storing means) such as a CD or a DVD for storing map data of a plurality of calendar years; 2 a CD/DVD drive for reading map data from the disk 1 under instruction from a main CPU 10; 3 an operation remote controller (specifying means) for specifying a calendar year (hereinafter may be referred to just as a "year"), a data item or the like to be displayed; 4 a year input part for inputting the year to be displayed; 5 a data item input part for inputting, among data items included in the map data, a data item to be displayed with emphasis (e.g., road information, facility information, address information, or telephone number information); and 6 a map display location input part for inputting an area of a map displayed on a screen.

A reference numeral 7 denotes a GPS receiver for receiving the current position information of a vehicle; 8 a gyro; 9 a car speed pulse detector; 10 a main CPU for executing various processing operations; 11 a target data searching part for reading, among the map data stored in the disk 1, map data of the year inputted by the year input part 4, and latest map data (map data other than that of the year inputted by the year input part 4); 12 an emphasis display data editing part (emphasis display editing means) for editing the map data of the year inputted by the year input part 4 to be displayed with emphasis; 13 a normal display data editing part (normal display editing means) for editing latest map data to be displayed in the normal display mode; and 14 a location detecting part for detecting the current position of a vehicle. It is to be noted that the data to be displayed with emphasis may be referred to just as "emphasis display data", and the data to be displayed in the normal display mode may be referred to just as "normal display data", A reference numeral 15 denotes a data superposing part for superposing the emphasis display data edited by the emphasis display data editing part 12 and the normal display data edited by the normal display data editing part 13 on each other; 16 a drawing LSI for displaying a map on a monitor 17 according to the display data superposed by the data superposing part 15; and 17 the monitor. The data superposing part 15, the drawing LSI 16 and the monitor 17 constitute a displaying means.

Figure 3:
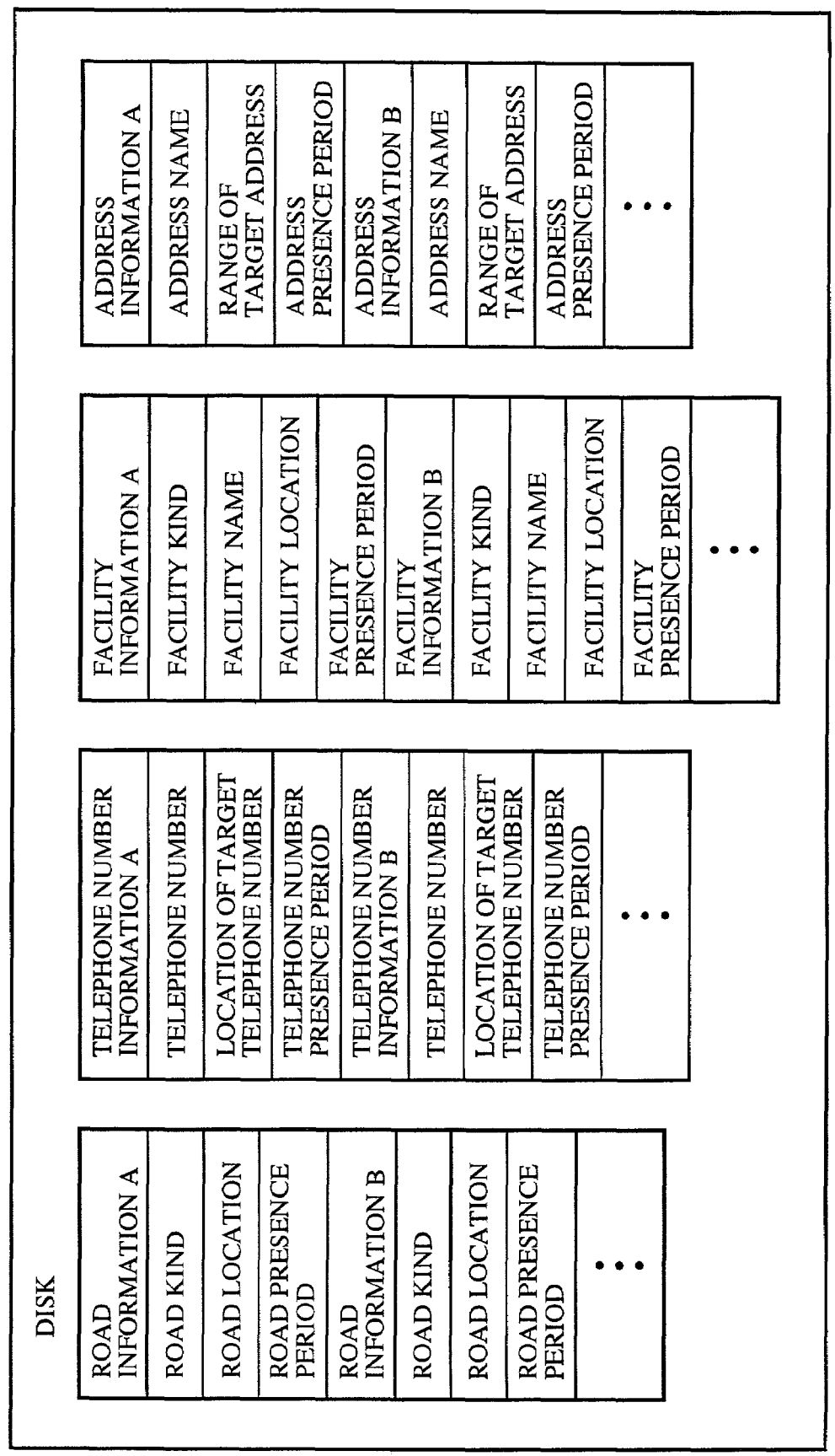
FIG. 3 is an explanatory view illustrating a data structure of map data stored in a disk.

FIG. 3 is an explanatory view illustrating the data structure of map data stored in the disk 1.

Next, the operation of the navigation device as configured above will now be described.

First, the disk 1 stores map data of a plurality of years. Specifically, as shown in FIG. 3, each map data includes data items, e.g., road information, facility information, address information, telephone number information, and so on, and a presence period is defined in each data item. Thus, for example, to investigate as to whether or not a road corresponding to road information A exists in a given year, it is only necessary to see the road presence period of the road information A.

For example, when a user requests the displaying of a latest map and the map of 1995, "1995" is entered by operating the year input part 4 of the operation remote controller 3. Especially, to specify a data item to be displayed with emphasis on the map, a target data item is entered by operating the data item input part 5 of the operation remote controller 3. For example, to display only a petrol station with emphasis, "PETROL STATION" is entered.

The target data search part 11 of the main CPU 10 controls, and reads the map data of the year inputted by the year input part 4 among the map data stored in the disk 1, and the latest map data.

After the reading of the map data of the specified year by the target data search part 11, the emphasis display data editing part 12 edits the thus read map data to be displayed with emphasis. However, if there is an entry of a data item to be displayed with emphasis from the data item input part 5, the emphasis display data editing part 12 edits, among the map data of the year, only the entered data item to be displayed with emphasis as emphasis display data, and other data items to be displayed as normal display data.

On the other hand, after the reading of the latest map data by the target data search part 11, the normal display data editing part 13 edits the read map data to be normal display data. Here, the normal display data means display data not displayed with emphasis.

The data superposing part 15 superposes the emphasis display data edited by the emphasis display data editing part 12 and the normal display data edited by the normal display data editing part 13 on each other. That is, the data superposing part 15 executes the processing of superposing the normal display data on the emphasis display data, and vice versa.

However, if the user operates the map display location input part 6, and enters the area of a map to be displayed on the screen, then the superposing of display data present in the area is executed.

It is to be noted that during the superposing of the display data, an own-vehicle mark is also superposed on the display data such that the own-vehicle mark can be displayed in a current position detected by the location detecting part 14.

After the superposing execution of the display data by the data superposing part 15, the drawing LSI 16 displays a map on the monitor according to the display data after the superposition.

Figure 4:
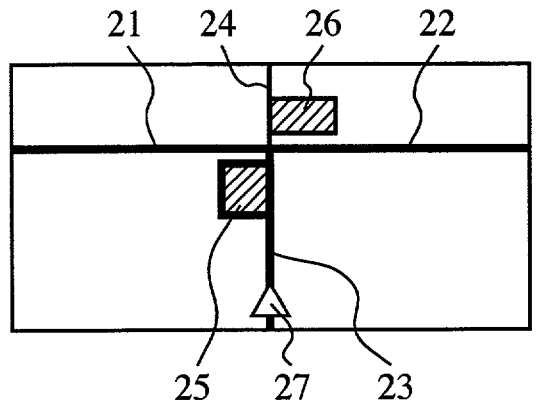
FIG. 4 is an explanatory view illustrating a map displayed on a monitor.

FIG. 4 is a view illustrating a map displayed on the monitor 17. In the drawing, reference numerals 21 to 23 denote roads displayed with emphasis; 24 a road normally displayed; 25 a facility (e.g., petrol station) displayed with emphasis; 26 a facility normally displayed; and 27 a self-vehicle position mark.

As apparent form the foregoing, according to the first embodiment, since the emphasis display data edited by the emphasis display data editing part 12 and the normal display data edited by the normal display data editing part 13 are superposed on each other and displayed, a clear visible map can be displayed.

The first embodiment has been described with reference to the case where the target data search part 11 reads the latest map data as a map data other than that of the year entered by the year input part 4. However, there should be no limitation placed in this regard, and the map data of other years may be read out.

Second Embodiment

In the first embodiment, the map data of the specified year was edited to be emphasis display data, and the latest map data was edited to be normal display data. However, the map data of the specified year may be edited to be displayed in the normal display mode, and the latest map data may be edited to be displayed in the weak mode. This arrangement is advantageous similarly to the first embodiment.

Figure 5:
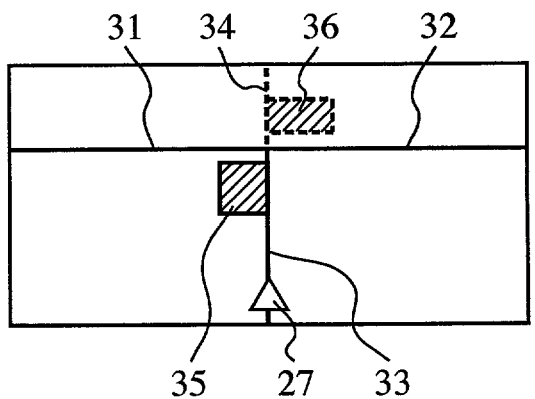
FIG. 5 is an explanatory view illustrating a map displayed on the monitor.

FIG. 5 is an explanatory view illustrating a map displayed on the monitor 17. In the drawing, reference numerals 31 to 33 denote roads normally displayed; 23 a road weakly displayed; 35 a facility (e.g., petrol station) normally displayed; and 36 a facility weakly displayed.

Third Embodiment

In the first embodiment, the map data of the specified year was edited to be emphasis display data, and the latest map data was edited to be normal display data. However, the map data of the specified year may be edited to be normal display data, and only the map of the specified year may be displayed.

Figure 6:
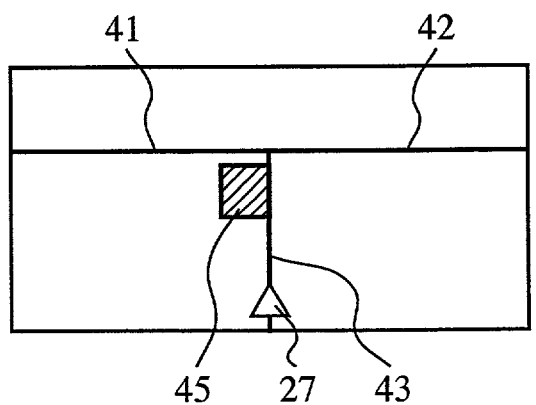
FIG. 6 is an explanatory view illustrating a map displayed on the monitor.

FIG. 6 is an explanatory view illustrating a map displayed on the monitor 17. In the drawing, reference numerals 41 to 43 denote roads normally displayed; and 45 a facility (e.g., petrol station) normally displayed.

Fourth Embodiment

In the first embodiment, the map of the specified year was displayed with emphasis, and the latest map was displayed in the normal display mode. However, as shown in FIG. 7, the map of the specified year may be displayed on the left-side of the monitor 17, and the latest map may be displayed on the right-side area of the monitor 17.

Figure 7:
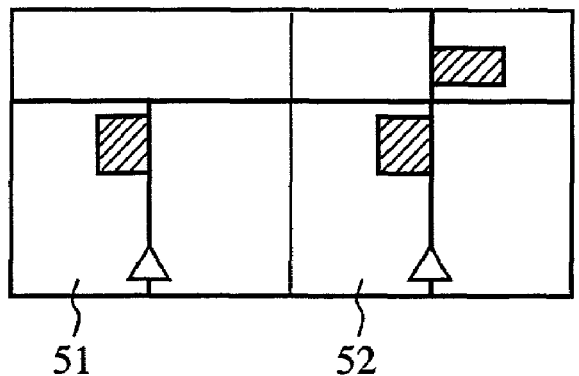
FIG. 7 is an explanatory view illustrating a map displayed on the monitor.
Figure 8:
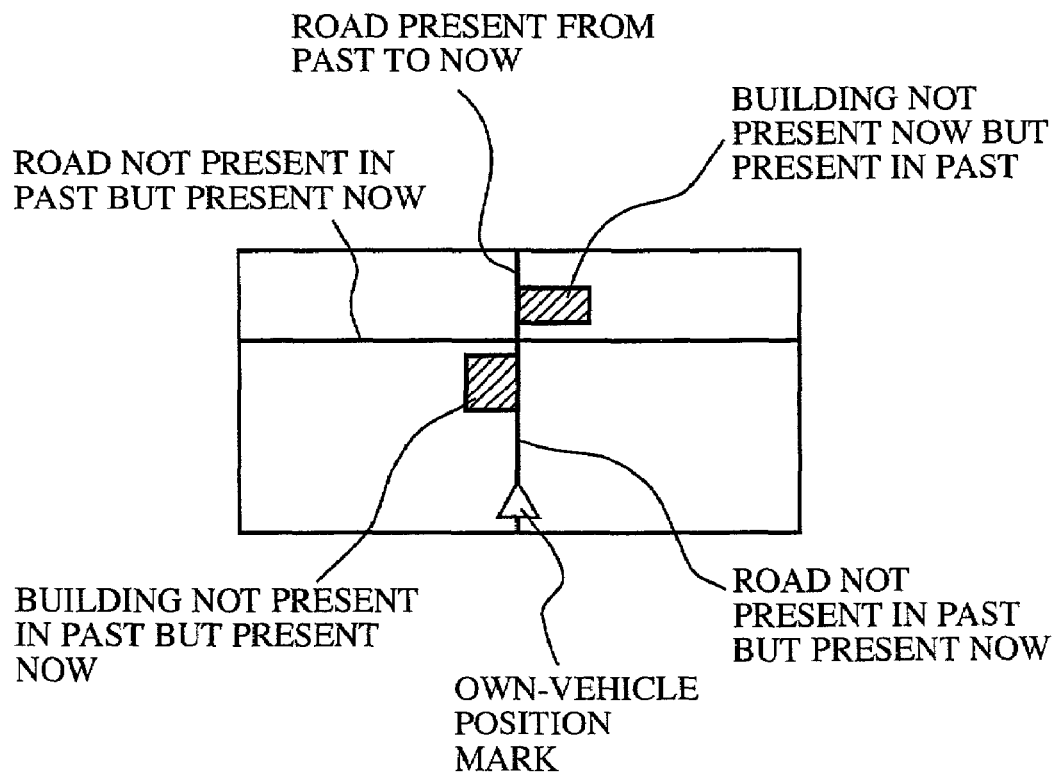
FIG. 8 is an explanatory view illustrating a conventional map.

FIG. 7 is an explanatory view illustrating a map displayed on the monitor 17. In the drawing, a reference numeral 51 denotes the map of a specified year; 52 a latest map.

Fifth Embodiment

Though there was no particular mention in any of the foregoing first to fourth embodiments, if the user operates the operation remote controller 3 to specify a year and a data item, then the updated portion of the map data may be searched based on the specified year and data item.

For example, when the user enters three consecutive years; namely 1998 to 2000, and "PETROL STATION AS DATA ITEM", by referring to the facility kind and the facility presence period of facility information in the map data, a newly opened petrol station or a closed petrol station can be searched during such three-year term 1998 to 2000.

Accordingly, the updated portion of the map data can be easily searched.

As described above, according to the present invention, the navigation device comprises: emphasis display editing means for reading map data of a year specified by the specifying means from the map storing means, and editing the thus read map data to be displayed in the emphasis display mode as emphasis display data; the normal display editing means for reading map data other than that of the year specified by the specifying means from said map storing means, and editing the read map data to be displayed in the normal display mode as normal display data; and the displaying means for displaying the emphasis display data edited by the emphasis display editing means and the normal display data edited by the normal display editing means in a superposing manner. Thus, an easily viewed map can be displayed.

According to the invention, when among data items included in the map data, a data item to be displayed with emphasis is specified by the specifying means, which emphasis display editing means edits only the specified data item to be emphasis display data, and other data items to be normal display data. Thus, a more easily viewed map can be displayed.

According to the invention, the navigation device comprises: map storing means for storing map data of a plurality of years; specifying means for specifying a year to be displayed; normal display editing means for reading map data of the year specified by the specifying means from the map storing means, and editing the map data to be displayed in the normal display mode as normal display data; weak display editing means for reading map data other than that of the year specified by the specifying means from the map storing means, and editing the map data to be displayed in the weak display mode as weak display data; and displaying means for displaying the normal display data edited by the normal display editing means and the weak display data edited by the weak display editing means in a superposing manner. Thus, an easily viewed map can be displayed.

According to the invention, when among the data items included in the map data, a data item to be normally displayed is specified by the specifying means, only the specified data item is edited to be normal display data, and other data items are edited to be weak display data. Thus, a more easily viewed map can be displayed.

According to the invention, the navigation device comprises: the editing means for reading map data of the year specified by the specifying means from the map storing means, and editing the map data to be display data; and displaying means for displaying the display data edited by the editing means. Thus, an easily viewed map can be displayed.

According to the invention, the navigation device comprises: the first editing means for reading map data of the year specified by the specifying means from the map storing means, and editing the map data to be display data; second editing means for reading map data other than that of the year specified by the specifying means from the map storing means, and editing the map data to be display data; and displaying means for displaying the display data edited by the first editing means in a first display area, and the display data edited by the second editing means in a second display area. Thus, easily viewed map can be displayed.

According to the invention, when a year and a data item are specified by the specifying means, the updated portion of the map data is searched based on the specified year and data item. Thus, the updated portion of the map data can be easily searched.

According to the invention, the data item specified by the specifying means is one selected from road information, facility information, address information, and telephone number information. Thus, the data item can be easily specified.

According to the invention, as the map data other than that of the year specified by the specifying means, the latest map data is read out. Thus, the latest map can be displayed.

What is claimed is:

1. A navigation device for displaying dated map data, comprising:
   map storing means for storing the map data for a plurality of years;
   specifying means for specifying a specific year of the map data to be displayed and specifying specific data items from the map data that is to be emphasized when displayed;
   first display editing means for reading the map data of the specific year from said map storing means, and editing the map data to be displayed;

second display editing means for reading map data of a different year from said map storing means, and editing the map data to be displayed; and displaying means for displaying the edited map data of the specific year and the edited map data of a different year;

wherein the edited map data from the specific year and the edited map data from the different year are superposed on said displaying means at the same time; and wherein the superposed map data, includes at least one of said emphasized data items specified by said specifying means from a specific year, and normal data items from the different year.

2. A navigation device according to claim 1, wherein the map data from the different year includes the latest map data.

3. A navigation device according to claim 2, wherein the emphasized data items include road information, facility information, address information or telephone number information.

4. A navigation device according to claim 1, wherein the map data includes data items and said displaying means displays emphasized data items in a visually weakened state.

5. A navigation device according to claim 4, wherein the data items include road information, facility information, address information or telephone number information.

6. A navigation device according to claim 1, further comprising: searching means for searching an updated portion of the map data based on the specified year and a data item.

7. A navigation device according to claim 6, wherein the data item includes road information, facility information, address information or telephone number information.

8. A navigation device for displaying dated map data, comprising:

map storing means for storing the map data from a plurality of years;

specifying means for specifying map data of a specific year to be displayed;

first editing means for reading map data of the specific year from said map storing means, and editing the map data to be displayed;

second editing means for reading map data of a different year from said map storing means, and editing the map data to be displayed; and displaying means for displaying the edited map data of a specific year in a first display area, and the edited map data of a different year in a second display area different from said first display area at the same time.

9. A navigation device according to claim 8, wherein the map data from the different year includes the latest map data.

10. A method for displaying dated map data from a navigation device, comprising the steps of:

storing the map data for a plurality of years;

specifying a specific year of the map data to be displayed and specifying specific data items from the map data that is to be emphasized when displayed;

reading the map data of the specific year from the stored map data;

editing the map data of the specific year to be displayed;

reading map data of a different year from the stored map data;

editing the map data of the different year to be displayed; and displaying the edited map data of the specific year and the edited map data of a different year;

wherein the edited map data from the specific year and the edited map data from the different year are superposed on a display; and wherein the superposed map data, includes at least one of said emphasized data items which is specified from said specific year and normal data items from said different year, and displaying the superposed map data.

11. A method for displaying dated map data from a navigation device, comprising the steps of:

storing the map data for a plurality of years;

specifying a specific year of the map data to be displayed;

reading the map data of the specific year from the stored map data;

editing the map data of the specific year to be displayed;

reading map data of a different year from the stored map data;

editing the map data of the different year to be displayed; and displaying the edited map data of the specific year and the edited map data of a different year;

wherein the edited map data of a specific year is displayed in a first display area, and the edited map data of a different year is displayed in a second display area different from said first display area at the same time.

* * * * *